(12) United States Patent
Tanner, Jr. et al.

(10) Patent No.: US 8,412,646 B2
(45) Date of Patent: Apr. 2, 2013

(54) SYSTEMS AND METHODS FOR AUTOMATIC CREATION OF AGENT-BASED SYSTEMS

(75) Inventors: Theodore C. Tanner, Jr., Hollywood, SC (US); Matthew Aldridge, North Charleston, SC (US); Gregory Jorstad, Charleston, SC (US)

(73) Assignee: Benefitfocus.com, Inc., Charleston, SC (US)

( * ) Notice: Subject to any disclaimer, the term of this patent is extended or adjusted under 35 U.S.C. 154(b) by 231 days.

(21) Appl. No.: 12/573,573

(22) Filed: Oct. 5, 2009
(Under 37 CFR 1.47)

(65) Prior Publication Data
US 2011/0087625 A1    Apr. 14, 2011

Related U.S. Application Data

(60) Provisional application No. 61/102,665, filed on Oct. 3, 2008.

(51) Int. Cl.
*G06F 15/18* (2006.01)
*G06F 17/20* (2006.01)

(52) U.S. Cl. ............ 706/12; 717/106; 718/100

(58) Field of Classification Search .............. None
See application file for complete search history.

(56) References Cited

U.S. PATENT DOCUMENTS

| | | | |
|---|---|---|---|
| 6,449,603 | B1 | 9/2002 | Hunter |
| 7,143,091 | B2 | 11/2006 | Charnock et al. |
| 7,225,183 | B2 | 5/2007 | Gardner |
| 7,792,836 | B2 | 9/2010 | Taswell |
| 8,010,567 | B2 | 8/2011 | Subramanyam et al. |
| 2003/0177112 | A1 | 9/2003 | Gardner |
| 2003/0196108 | A1 | 10/2003 | Kung |
| 2004/0015701 | A1 | 1/2004 | Flyntz |
| 2004/0015783 | A1 | 1/2004 | Lennon et al. |
| 2004/0098358 | A1* | 5/2004 | Roediger ............ 706/46 |
| 2004/0153908 | A1 | 8/2004 | Schiavone et al. |
| 2005/0216705 | A1 | 9/2005 | Shibayama et al. |

(Continued)

FOREIGN PATENT DOCUMENTS

| | | |
|---|---|---|
| KR | 10-0241646 B1 | 2/2000 |
| WO | WO 01/09831 A2 | 2/2001 |

(Continued)

OTHER PUBLICATIONS

International Preliminary Report on Patentability mailed Apr. 14, 2011, in PCT Application No. PCT/US2009/059527, filed Oct. 5, 2009, 9 pgs.

(Continued)

*Primary Examiner* — Kakali Chaki
*Assistant Examiner* — Kalpana Bharadwaj
(74) *Attorney, Agent, or Firm* — John R. Thompson; Stoel Rives LLP

(57) ABSTRACT

An agent-based system may be automatically generated from a specification provided by a user or third-party process. An agent generator may map the specification to a canonical model identifying one or more tasks to be performed by the agent-based system as ontological concepts. The agent generator may generate one or more candidate agents using the canonical model. The candidate agents may comprise one or more interconnected data transforms, which may comprise data access transforms, preprocessing transforms, machine learning transforms, and/or structural transforms. The agent generator iteratively modifies the agent-based system until a termination criteria is satisfied. The termination criteria may provide a selection mechanism whereby a performance of the plurality of candidate agents may be evaluated. An optimal agent may be selected using, inter alia, the performance of the agent-based system.

28 Claims, 5 Drawing Sheets

U.S. PATENT DOCUMENTS

| | | | |
|---|---|---|---|
| 2005/0278325 A1 | 12/2005 | Mihalcea et al. | |
| 2005/0289342 A1 | 12/2005 | Needham et al. | |
| 2006/0059567 A1 | 3/2006 | Bird et al. | |
| 2006/0206883 A1 | 9/2006 | Sabbouh | |
| 2007/0074182 A1* | 3/2007 | Hinchey et al. | 717/136 |
| 2008/0010233 A1 | 1/2008 | Sack et al. | |
| 2008/0021701 A1 | 1/2008 | Bobick et al. | |
| 2008/0086436 A1 | 4/2008 | Zhao et al. | |
| 2008/0127146 A1 | 5/2008 | Liao et al. | |
| 2008/0134286 A1* | 6/2008 | Amdur et al. | 726/1 |
| 2008/0222634 A1 | 9/2008 | Rustagi | |
| 2008/0222694 A1 | 9/2008 | Nakae | |
| 2008/0294624 A1 | 11/2008 | Kanigsberg et al. | |
| 2009/0094231 A1 | 4/2009 | Marvit et al. | |
| 2009/0254540 A1 | 10/2009 | Musgrove et al. | |
| 2009/0300002 A1 | 12/2009 | Thomas et al. | |
| 2010/0049687 A1 | 2/2010 | Patten et al. | |
| 2010/0146593 A1 | 6/2010 | Stahl et al. | |
| 2010/0169966 A1 | 7/2010 | Yalamanchi et al. | |
| 2010/0287158 A1 | 11/2010 | Toledano et al. | |
| 2011/0126281 A1 | 5/2011 | Ben-Zvi et al. | |
| 2011/0321051 A1 | 12/2011 | Rastogi | |
| 2012/0102050 A1 | 4/2012 | Button et al. | |

FOREIGN PATENT DOCUMENTS

| | | |
|---|---|---|
| WO | WO 0125882 | 4/2001 |
| WO | WO 02/097667 A2 | 12/2002 |

OTHER PUBLICATIONS

Jain, Amit and Farkas, Csilla, Article entitled "Secure Resource Description Framework: an Access Control Model", Center for Information Assurance Engineering, Department of Computer Science & Engineering, University of Carolina, Columbia, South Carolina, 2006 (9 pgs.).

Office Action for U.S. Appl. No. 12/534,676, mailed Nov. 14, 2011, all pages.

Office Action for U.S. Appl. No. 12/534,676, mailed Feb. 27, 2012, all pages.

Wei, Liu et al., "Semi-Automatic Ontology Extension Using Spreading Activation," Journal of Universal Knowledge Management, vol. 0, No. 1 (2005), pp. 50-58, submitted: Feb. 7, 2005, accepted: Apr. 18, 2005, published: Jun. 28, 2005.

Office Action Summary for U.S. Appl. No. 12/943,765 mailed Aug. 23, 2012, 18 pgs.

Office Action for U.S. Appl. No. 12/534,676, filed Aug. 3, 2009, and mailed Oct. 1, 2012, all pages.

Sieg, Ahu, et al., "Representing Context in Web Search with Ontological User Profiles," School of Computer Science, Telecommunication and Information Systems, DePaul University, Chicago, Illinois, pp. 439-452, 2007.

* cited by examiner

US 8,412,646 B2

SYSTEMS AND METHODS FOR AUTOMATIC CREATION OF AGENT-BASED SYSTEMS

CROSS-REFERENCE TO RELATED APPLICATIONS

This application claims priority under 35 U.S.C. §119(e) to U.S. Provisional Patent Application No. 61/102,665, filed Oct. 3, 2008, and entitled "Systems and Methods for Automatic Creation of Agent-Based Systems," which is hereby incorporated by reference in its entirety.

TECHNICAL FIELD

This disclosure relates to systems and methods for automatically generating an agent-based system configured to perform a particular task.

BRIEF DESCRIPTION OF THE DRAWINGS

Additional aspects and advantages will be apparent from the following detailed description of preferred embodiments, which proceeds with reference to the accompanying drawings, in which.

DETAILED DESCRIPTION OF PREFERRED EMBODIMENTS

Figure 1A:
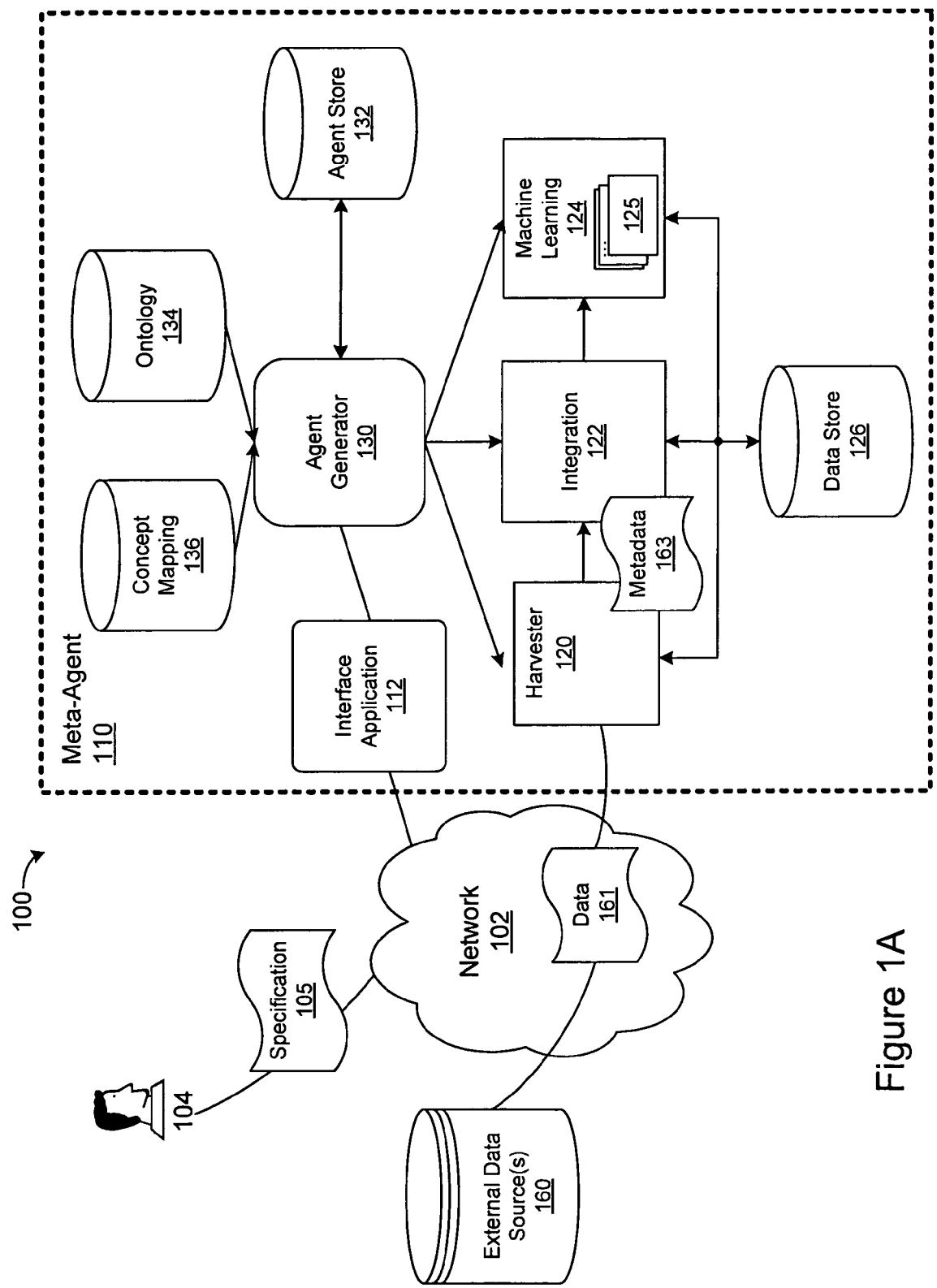
FIG. 1A is a block diagram of one embodiment of a system for generating an agent-based system.

An agent or agent-based system may be used to perform a task for a user, such as data processing, data mining, or the like. As used herein, an "agent" or an "agent-based" system may refer to software and/or hardware components configured to perform a data processing task. As such, an agent may include, but is not limited to: an expert system, a semantic intelligence system, a machine learning system, a data mining system, a predictive analytic system, or the like.

An agent may be comprised on one or more transforms. As used herein, a transform may refer to any task related to data gathering, data processing, data flow (e.g., data flow between transforms), data analysis, or the like. A transform, therefore, may include, but is not limited to: data acquisition, data harvesting, data aggregation, data cleansing, data formatting, data mining, machine leaning, pattern matching, results formatting, and the like.

The process of developing an agent-based system may include selecting, configuring, and/or combining various transforms into one or more agents adapted to perform a particular task. Once an agent-based system has been created (e.g., transforms selected, configured, and/or combined), the system may be tested and/or refined. The testing may include providing the agent-based system with one or more datasets, evaluating results produced by the system responsive to the datasets, and modifying the system accordingly. The datasets may include test datasets for which a known "answer" or desired result exists. Alternatively, or in addition, the datasets may include "real-world" data. In some embodiments, the testing may be iterative; after each iteration, the results produced by different variations of the agent-based system may be compared to identify an "optimally performing" version of the system.

As illustrated above, the development of an agent-based system may be tedious and time consuming, and may require skills that are beyond those of typical users. In fact, in many situations, the development of an agent-based system may require the services of one or more "domain exerts" (persons who have the expertise required to select, combine, configure, and/or refine the transforms comprising the agent-based system).

The systems and methods disclosed herein may be used by typical users (e.g., non-expert users) to automatically generate an agent-based system. In one embodiment, an agent generator (e.g., a "meta-agent") may be provided, which may be capable of autonomously generating an agent-based system. The agent generator may be configured to receive an "agent specification" from a user, which may define the problem and/or data sources to be addressed by the system. A canonical model of the specification may be determined by mapping tasks defined in the specification to concepts within an ontology. The canonical model may also include a mapping between the data sources identified in the specification and the ontology.

Responsive to deriving the canonical model of the specification, the agent generator may be configured to select one or more transforms from a transform ensemble to form an agent-based system. The transforms comprising the agent-based system may be iteratively evaluated and modified until an "optimal" system is determined.

Figure 1B:
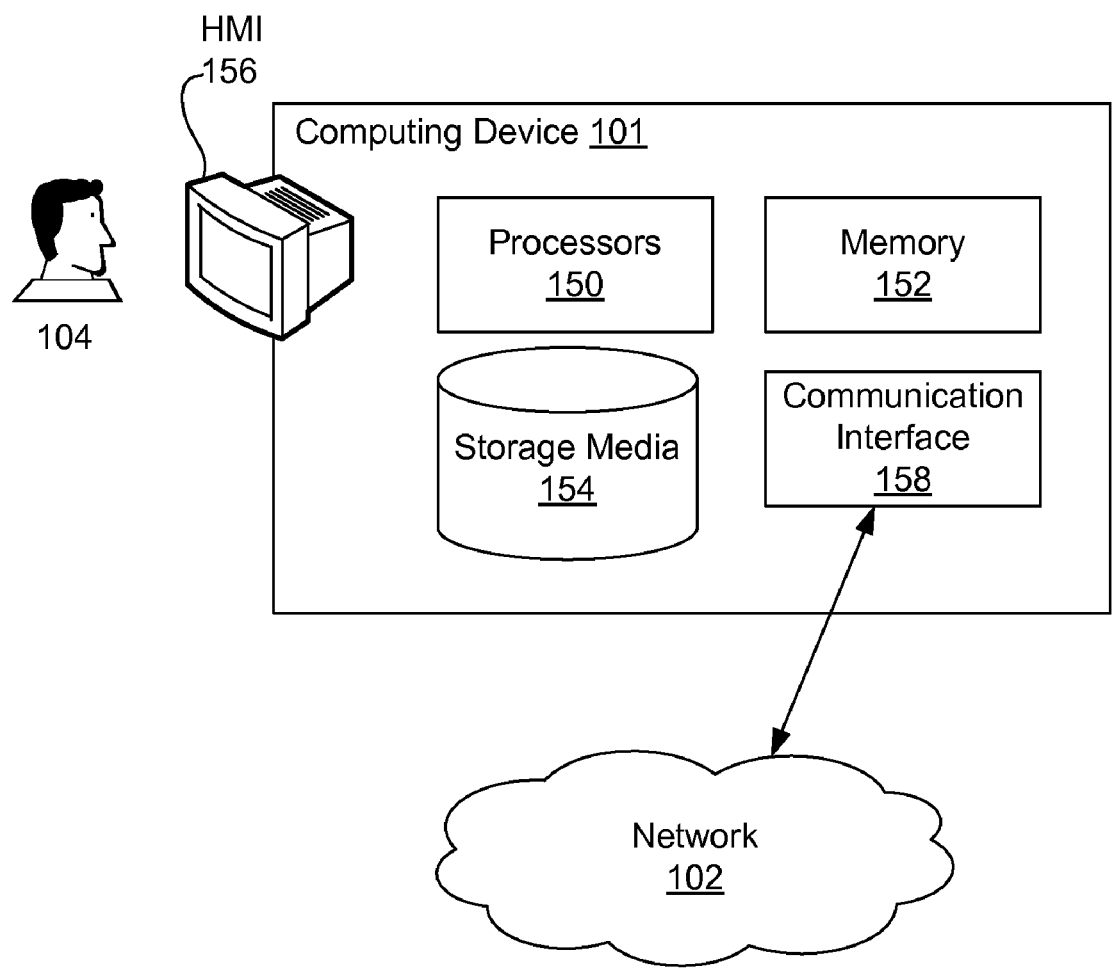
FIG. 1B is a block diagram of a computing device.

FIG. 1A is a block diagram of one embodiment of a system 100 for automatically generating an agent-based system. In some embodiments, one or more components of the system 100 (e.g., the meta-agent 110, the agent generator 130, the modules 120, 122, and/or 124) may be implemented on and/or in conjunction with one or more computing devices, such as the computing device 101 depicted in FIG. 1B. As shown in FIG. 1B, a computing device 101 may include one or more processors 150, memory modules 152, computer-readable storage media 154, a human-machine interface 156, a communications interface 158, and the like. The processors 150 may include one or more general purpose processors and/or one or more special purpose processors (e.g., one or more Application Specific Integrated Circuit (ASIC) processors). The memory modules 152 may include volatile and/or non-volatile memory storage resources. The computer-readable storage media 154 may include one or more discs, optical storage, Flash memory modules, or the like. The human-machine interface (HMI) 156 may allow a user 104 to interact with the computing device 101, and may comprise a display, input/output devices (e.g., mouse, keyboard, etc.), and the like. The communications interface 158 may include one or more adapters configured to communicatively couple the computing device 101 to one or more networks 102. The communications interface 158 may include, but is not limited to: a wired network interface (e.g., Ethernet), an optical network interface (e.g., fiber optic interface), a wireless network interface, a public switched telephone network (PSTN) interface (e.g., a modem), a cellular network interface (e.g., a 3G network interface), or the like.

Referring back to FIG. 1A, the system 100 comprises a meta-agent 110, which may be communicatively coupled to one or more external data sources 160 and/or a user 104 by a network 102. The network 102 may comprise any communications network known in the art including, but not limited to: an Internet protocol (IP) network (e.g., a Transmission Control Protocol IP network (TCP/IP) or the like), a local area network (LAN), a wide area network (WAN), a virtual private network (VPN), a wireless network (e.g., IEEE 802.11a-n, Bluetooth®, EDGE, G3, or the like), a public switched telephone network (PSTN), a cellular telephone network, or the like.

The user 104 may be communicatively coupled to the meta-agent module 110 via a respective computing device (not shown), which may comprise any computing device known in the art including, but not limited to: a personal computing device (e.g., a personal computer (PC) or the like), a mobile computing device (e.g., a laptop computer, an ultra portable computer, or the like), a smart phone, a personal digital assistant, or the like. The user 104 may interact with the meta-agent module 110 via a general purpose application (not shown) running on the user computing device, such as web browser software, a Telnet portal, or the like. Alternatively, or in addition, the user 104 may interact with the meta-agent module 110 via a special purpose application 112 provided by the meta-agent module 110.

As will be discussed in additional detail below, a user 104 may submit an agent specification 105 to the meta-agent module 110, which may indicate what type of agent-based system the user 104 requires: define the problem to be solved by the system (e.g., define the task to be performed by the system), identify the data sources required to perform the task, and/or specify how various outputs are to be formatted. For example, the specification 105 may indicate that the user is interested in identifying stocks traded on the New York Stock Exchange (NYSE) that exhibit a particular trend, such as an "Inverted Hammer" pattern, "Inverted Cup" pattern, or the like. The specification 105 may further indicate that the user 104 wants to limit the search to stocks within a particular industry, to stocks having a particular price-to-earnings (PE) ratio, having a particular market capitalization, or the like. In another example, the specification 105 may indicate the user 104 wishes to find content relating to a particular topic, such as a medical condition. The specification 105 may restrict the search space to content that has been peer reviewed, was authored by researchers having a particular set of credentials (e.g., degree from a particular set of schools, published in a particular set of journals, etc.), having a particular type of experience, and so on.

Although two non-limiting examples of a specification 105 are provided herein, one skilled in the art would recognize that the specification 105 could relate to any topic or area of interest known in the art, and could be adapted to include any qualifiers and/or parameters related to the particular topic and/or area of interest known in the art.

The meta-agent module 110 may construct an agent-based system in accordance with the specification 105. Upon receiving a specification 105 from a user 104, the meta-agent module 110 may route the specification 105 to the agent generator module 130, which may be configured to derive a canonical model from the specification 105. As will be discussed below, the canonical model may comprise an ontological mapping between the specification 105 and the ontology 134 (discussed below). Using the canonical model, the agent generator 130 may select a set of transforms from a transform ensemble, from which an agent-based system may be generated. In some embodiments, the transforms comprising the agent-based system may be iteratively modified until an optimal agent-based system is identified.

The meta-agent 110 may include an ontology 134, which may be used to develop a canonical model of the specification 105, identify concepts associated with data 161 accessed from various data source(s) 160, select transforms for inclusion in an agent-based system, and the like. As used herein, an ontology, such as the ontology 134, may refer to an organized collection of knowledge referring to both the meaning of natural language terms (e.g., concepts) and relationships between concepts. In some embodiments, an ontology may be implemented as a graph data structure having a plurality of vertices (e.g., nodes) interconnected by one or more edges. The vertices may refer to concepts within the ontology, and the edges interconnecting the vertices may represent relationships between related concepts within the ontology. The ontology 134 may be implemented in conjunction with a computing device, such as the computing device 101 of FIG. 1B, which may be configured to make ontological information available to other modules and/or devices (e.g., over the network 102). The ontology 134 may comprise computer-readable storage media on which the ontology data structure is embodied including, but not limited to: a dedicated ontology store (e.g., Allegro® or the like); a database (e.g., a Structured Query Language (SQL) database, eXtensible Markup Language (XML) database, or the like); a directory (e.g., an X.509 directory, Lightweight Directory Access Protocol (LDAP) directory, or the like); a file system; a memory; a memory-mapped file; or the like.

In some embodiments, the ontology 134 may comprise a data access layer (not shown), such as an application-programming interface (API), a remote access protocol (e.g., SOAP, RMI, etc.), or the like. The data access layer may provide for programmatic access to and/or modification of the ontology 134 (e.g., using a language, such as Semantic Application Design Language (SADL), or the like).

The ontology 134 may comprise precompiled knowledge in a format suitable for automated processing by the agent generator 130. For example, the ontology 134 may be formatted in Web Ontology Language (OWL or OWL2), Resource Description Format (RDF), Resource Description Format Schema (RDFS), or the like.

The ontology 134 may be compiled from one or more knowledge sources comprising concepts and relationships between concepts. Such knowledge sources may include, but are not limited to encyclopedias, dictionaries, and the like. In some embodiments, the ontology 134 may comprise information obtained from an online encyclopedia, such as Wikipedia® (registered trademark of Wikimedia Corp. of San Francisco, Calif.), Encarta® (registered trademark of Microsoft Corp. of Redmond, Wash.), or the like.

In some embodiments, the ontology 134 may be generated by crawling through the topics of a knowledge source using a web-based crawler, script, or the like. Each resource (e.g., webpage) in the knowledge source may be represented within the ontology 134 as a concept. Edges (e.g., relationships between concepts) may be extracted by categorization information in the knowledge source, such as links. For example, a knowledge source may comprise links to related material; edges may be created for each link within a particular concept (e.g., concept webpage).

In some embodiments, the ontology 134 may comprise information from a plurality of different knowledge sources. The ontology 134 may be adaptive, such that the concepts and/or relationships between concepts may be modified (e.g., strengthened, weakened, created, and/or removed) responsive to machine learning techniques, user feedback, changes to the underlying knowledge sources, or the like.

In some embodiments, the ontology 134 may change over time responsive to knowledge input into the ontology 134 and/or feedback received from users (e.g., the agent generator module 130, users 104, or the like). In addition, the ontology 134 may be modified responsive to updates to the one or more knowledge sources used to generate the ontology 134. As such, the ontology 134 may comprise an updating mechanism (e.g., crawlers, scripts, or the like) to monitor the one or more knowledge sources underlying the ontology 134, and to update the ontology 134 responsive to changes detected in the respective knowledge sources.

An ontological mapping module 136 may be configured to associate data (e.g., natural language text, numerical data, or the like) with a corresponding ontological concept. Accordingly, the mapping module 136 may be configured to map the data 161 and/or the portions of the agent specification 105 to one or more concepts within the ontology 134. For instance, data 161 relating to a stock quote may be mapped to a "stock quote" concept within the ontology 134. Examples of systems and methods for concept mapping are provided in co-pending U.S. patent application Ser. No. 12/534,676 filed Aug. 3, 2009, and entitled, "Systems and Methods for Concept Mapping," which is hereby incorporated by reference in its entirety.

As discussed above, the meta-agent module 110 may receive a specification 105 directing the meta-agent module 110 to generate an agent-based system configured to achieve a particular task using a particular set of data. The specification 105 may be routed to the agent generator module 130, which may autonomously or quasi-autonomously generate an agent-based system capable of implementing the specification 105.

The agent generator 130 may be configured to derive a canonical model from the specification 105. As discussed above, a canonical model may refer to an ontological mapping between the specification 105 and the ontology 134. Accordingly, the canonical model may identify concepts associated with the tasks defined in the specification 105. For instance, if the specification 105 included a directive to "identify biotechnology company stocks exhibiting an 'Inverted Cup" pattern in the last 6 months," the canonical model may include a corresponding directive expressed as logical combination of concepts within the ontology 134 (e.g., in Common Algebraic Specification Language format, in Common Logic Format (CLF), in Rule Interchange Format (RIF), in OWL, or the like). The canonical model may also include conceptual mappings between data sources identified within the specification 105 and concepts within the ontology 134. For instance, the canonical model derived from a specification 105 identifying stock ticker data may include a corresponding "stock ticker" concept mapping. The development of a canonical model from the specification 105 may be performed by the concept mapping module 136, which may leverage the concept mapping techniques described above.

Using the canonical model, the agent generator 130 may programmatically determine the nature of the agent-based system required by the specification 105. For example, the agent generator 130 may include a priori knowledge indicating which machine learning transforms are effective at performing particular ontological tasks (e.g., pattern matching, etc.). Similarly, the agent generator 130 may know which transforms are effective at preprocessing certain types of data. In addition, the canonical model may allow the agent generator 130 to identify and/or generate one or more performance metrics whereby sets of candidate transforms may be evaluated and/or compared to one another (e.g., to select an "optimal" set of transforms for inclusion in the agent-based system).

The agent generator 130 may construct the candidate agent-based systems using transform components available in the meta-agent module 110 including, but not limited to: a harvester module 120, an integration module 122, a machine learning module 124, the ontology 134, and/or the ontology mapping module 136. In some embodiments, the agent generator 130 may be configured to generate a plurality of candidate agent-based systems (each comprising a set of candidate transforms) and to select an "optimal" agent-based system therefrom. The selection may be based upon the performance of the candidate transforms in a testing and/or real-world environment.

The harvester module 120 may be configured to communicate with one or more external data sources 160 over the network 102 to obtain data 161 therefrom. The external data sources 160 may comprise any data source known in the art including, but not limited to: databases, such as Structured Query Language (SQL) databases, eXtensible Markup Language (XML) databases, or the like; directory systems, such as an X.509 directory, a Lightweight Directory Access Protocol (LDAP) directory, or the like, a hierarchical and/or flat file system, a sequence of space-delimited values (SDV), natural language content (e.g., text content), web content (e.g., content formatted as Hyper Text Markup Language (HTML) data); delimiter-separated values; formatted data (e.g., data in Portable Document Format (PDF), as a Microsoft® Word Document, etc.); or the like.

The agent generator 130 may configure the harvester 120 to access data required by the agent-based system construed thereby (e.g., as defined in the specification 105). The harvester 120 may be configured to access data from particular locations (e.g., from particular data sources 160), to access data in particular format, to access data meeting a particular set of qualifications (e.g., produced by researchers having a particular set of qualifications), and so on. For example, if the specification 105 calls for processing a particular type of data (e.g., financial data, such as stock quotes, earnings information, or the like), the agent generator 130 may configure the harvester module 120 to access data 161 of a particular type and/or from an appropriate data store (e.g., access financial data from an SEC database, stock quote provider, and so on).

The harvester module 120 may be capable of interacting with different types of external data sources(s) 160. For example, if the specification 105 calls for data accessible via the Internet (e.g., via the network 102), the harvester module 120 may provide a web crawler to crawl one or more web-accessible storage locations (e.g., websites) provided by the data source(s) 160. The web crawlers may be configured to interact with the external data source(s) 160 via Hyper Text Transfer Protocol (HTTP), Secure HTTP (HTTPS), File Transfer Protocol (FTP), Telnet, or any other protocol and/or port provided by the respective external data source 160. The harvester module 120 may be communicatively coupled to the network 102 by a communications interface (not shown), such as the communication interface 158 of FIG. 1B.

In some embodiments, the harvester 120 may be configured to determine a set of metadata 163 describing the data 161. The metadata 163 may be used by the integration module 122 (described below) to parse the data 161. The metadata 163 may be provided by the external data source(s) 160, may be provided by the user 104, and/or may be automatically determined by the harvester module 120. For example, an external data source 160 may publish metadata 163 describing the data 161 provided thereby. The harvester module 120 may be configured to access the metadata 163 with the data 161. In another example, the user 104 may access the external data source 160 directly, and may identify or otherwise indicate to the harvester module 120 which entries within the data source 160 are relevant to the user 104, provide data type and/or formatting information, specify parsing directives, and the like (e.g., via the interface application 112 and/or as a plug-in to a browser application). The user-provided information may be used to define metadata 163 describing the data 161 obtained from the data source 160. Alternatively, or in addition, the specification 105 provided by the user 104 (or canonical model derived therefrom) may provide information regarding the external data source(s) 160 from which the metadata 163 may be derived. In some embodiments, the harvester module 120 may automatically determine the metadata 163 by inter alia mapping data type and/or other information obtained from the external data source(s) 160 to concepts within an ontology 134 as described below.

The integration module 122 may be configured to preprocess the data 161 received from the external data source(s) 160 using inter alia the metadata 163. The preprocessing may include identifying data that is relevant to the agent-based system within the data 161 (e.g., parsing the relevant data from a webpage), validating the data 161 (e.g., based upon data type information), removing corrupt data, qualifying the data 161 (e.g., based upon requirements defined in the specification 105), filtering the data 161, cleansing the data 161, and so on.

The data 161 acquired by the harvester module 120 and preprocessed by the integration module 122 may be stored in a data store 126, which may comprise computer-readable storage media, such as one or more discs, optical media, memory storage, and the like.

The machine learning module 124 may comprise one or more machine learning algorithms 125, which may be used by the agent generator 130 to generate an agent according to the specification 105. In some embodiments, the agent generator 130 may assemble (e.g., combine) multiple machine learning algorithms 125 provided by the machine learning module 124 into a single agent-based system. The agent generator 130 may be configured to adapt the machine learning algorithms 125 to perform the tasks defined in the specification 105 (e.g., by setting algorithm 125 parameters, combining algorithms 125, etc.)

As discussed above, the agent generator module 130 may derive a canonical model from the specification 105 using the concept mapping module 136 and the ontology 134. Using the canonical model, the agent generator 130 may generate an agent-based system comprising a set of transforms (provided by the harvester, integration, and/or machine learning modules 120, 122, and 124). The transforms comprising the agent-based system may be selected according to the canonical model (e.g., the transforms may be selected to interact with data specified in the model, to achieve the tasks in the model, and so on).

In some embodiments, the agent generator module 130 may iteratively refine the agent-based system until an "optimal" set of transforms is identified. The iterative refinement may comprise iteratively modifying the transforms comprising the agent-based system until a termination criteria is satisfied (e.g., modifying the configuration of the transforms, the arrangement of the transforms, data flow between the transforms, and the like). The modifications may further include the addition, removal, and/or replacement of one or more candidate transforms.

An "optimal" set of transforms may be identified using a performance or fitness metric defined in the canonical model. The fitness metric may quantify how effective the set of transforms is at performing the task defined in the canonical model. The optimization process may comprise a "meta-machine learning technique," which may include, but is limited to: a genetic algorithm; a local search; a distributed local search; or the like.

During the optimization process, the current state of the one or more sets of candidate transforms may be maintained in the agent data store 132. The current state of the transforms system may refer to the configuration of the transforms comprising the system including, but not limited to: the set of candidate transforms included in the system, transform configuration parameters, transform structure parameters, transform structure, including data flow between different transforms, transform ordering, and so on.

In some embodiments, the agent data store 132 may represent the agent-based system as a two dimensional grid data structure. Each row in the grid may represent a different transform (a data access transform, a preprocessing transform, a machine learning transform, a structural transform, or the like). Columns within each row may represent variations of the transform (e.g., using different configuration parameters, thresholds, or the like). The agent generator 130 may perform a search within the grid to identify an optimally performing set of transforms.

Figure 2:
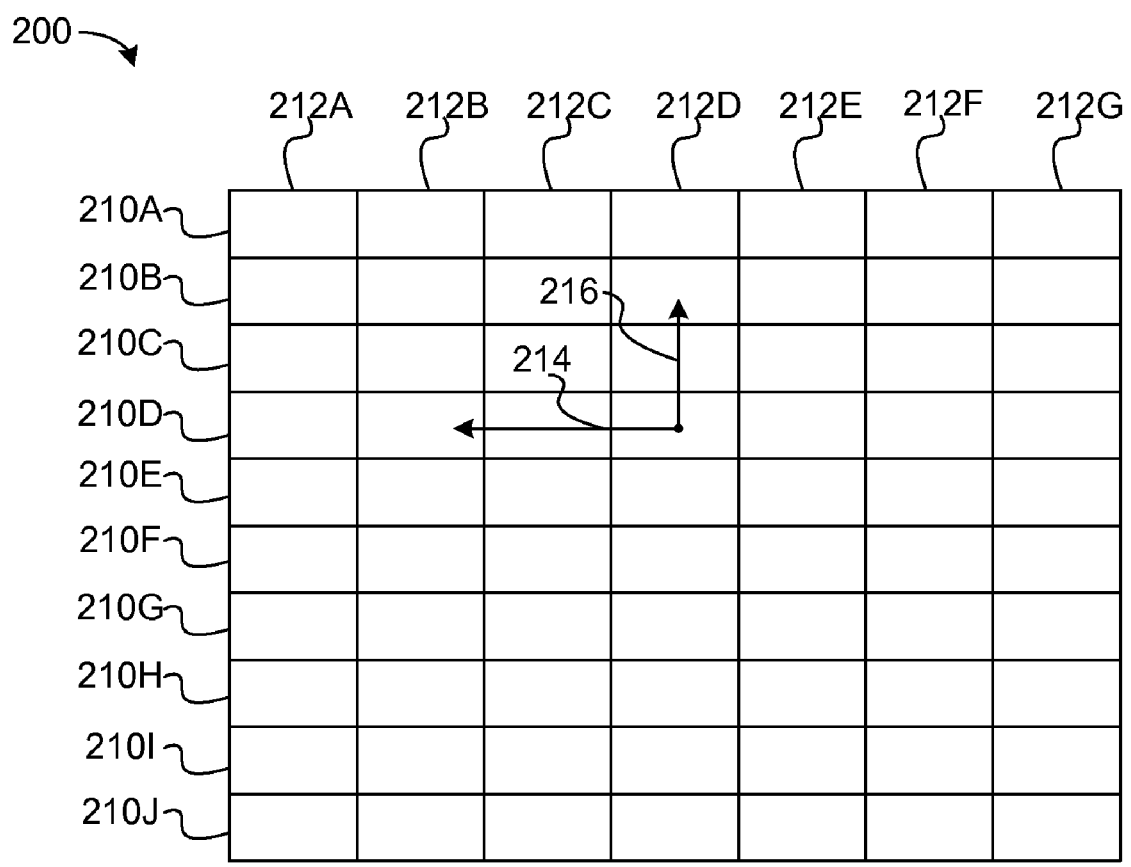
FIG. 2 is a diagram of one embodiment of a datastructure comprising a plurality of transform and transform variants.

FIG. 2 shows one embodiment of a transform datastructure 200. The transform datastructure 200 could be stored in the agent datastore 132 of FIG. 1A for use by the agent generator 130 to produce an "optimal" agent-based system. Each row 210A-210J in the datastructure 200 may correspond to a particular transform. The columns 212A-212G may correspond to different variants of the transform (e.g., a modification to one or more parameters of the transform or the like).

As discussed above, the transforms of rows 210A-210J may correspond to data acquisition transforms, data preprocessing transforms, algorithmic transforms, and/or structural transforms. Although a particular set of transforms is discussed herein, the disclosure is not limited in this regard; the data structure 200 could be adapted to include any set of data transformations known in the art.

A data acquisition transform may include directives to read data from a data source (e.g., an external data source 160 of FIG. 1A). For example, a data acquisition transform may include an instruction to read N number of records of a particular type from a data source at a particular Uniform Resource Indicator (URI) address.

The data structure 200 may include one or more preprocessing transforms, which may relate to preprocessing of data obtained from one or more data sources. For instance, preprocessing transforms may include, but are not limited to: a select transform to select a particular datum from a particular dataset; a filter transform to filter one or more datasets based on one or more filtering criteria; a derive transform to create a new datum from one or more datasets; an aggregate and/or merge transform to combine two or more datasets into a single set; a standardize transform to reformat a dataset into a particular standardized format; or the like.

Machine learning transforms may be represented within the data structure 200. As discussed above, a machine learning transform may implement the data analysis and processing algorithms necessary to perform the tasks defined in the agent specification (e.g., identify "Inverted Cup" patterns within a set of stock quotes). For example, a row 210A-210J of the data structure 200 may represent a decision tree algorithm, such as a Classification and Regression Tree (CART), Multivariate Adaptive Regression Spline (MARS), a C4.5 decision tree, or the like. Another row 210A-210J may represent a clustering algorithm, such as a K-means algorithm, a Kohonen algorithm, or the like. Other rows 210A-210J may correspond to other machine learning transforms including, but not limited to: a Bayes classifier (e.g., a naïve Bayes algorithm); a neural network algorithm (e.g. a back propagation neural network); a genetic algorithm; K-nearest neighbor; or the like.

Structural transforms may relate to the data flow between the transforms represented in the data structure 200. For example, one or more structural transforms may cause an output of a first data acquisition transform to flow to an input of a preprocessing transform, and may cause the output of the preprocessing transform to flow to an input of a machine learning transform, and so on.

The columns 212A-212G of each row 210A-210J in the data structure 200 may comprise variants of the respective transform. The columns 212A-212G may vary parameters of the transform, inputs to the transform, arrangements of other transforms, or the like. For example, the transform of row 210A may comprise a data acquisition transform (implemented by the harvesting module 120 of FIG. 1A) configured to obtain data from one or more data sources. The columns 212A-212G of row 210A may vary the Uniform Resource Indicator (URI) from which the harvest occurs, modify the data obtained at the various data sources, or the like. Other transforms may be varied in a similar manner. For instance, a "merge" data preprocessing transform may be varied according to the particular dataset fields that are merged, the nature of the merge (e.g., averaging, mean, etc.), or the like. Machine learning transforms may be varied by modifying the parameters of the various algorithmic transforms, modifying the datasets input into the transforms, modifying which dataset features are input to the transform, modifying thresholds applied to the transforms, and so on.

Each of the transforms within the datastructure 200 (e.g., rows 210A-210J) may be modified according to a particular column 212A-212G associated with the respective transform. In this way, an agent generator, such as the agent generator 130 of FIG. 1, may permute one or more transforms to optimize an agent according to a particular specification. In some embodiments, the permutations available between transforms in the datastructure 200 may be represented as transforms themselves. Such transforms may be referred to as structural transforms. As discussed above, a structural transform may define which transforms may be combined into a particular agent, may determine data flow between agents, may determine how transforms are arranged (e.g., order processing), and so on. For instance, a structural transform may indicate that the output of a particular transform should flow to an input of another transform. For example, the output of a "harvest data" transform could flow to a "merge" transform to preprocess the data, and the output of the "merge" transform could flow to a machine learning transform (e.g., a K-nearest neighborhood transform or the like), and so on. Other structural transforms ("mutation" structural transforms) may call for the removal and/or addition of other transforms in the data structure 200, replacement of a first transform with a second transform, or the like.

Referring back to FIG. 1A, the agent generator 130 may be configured to seed the agent datastore 132 with a set of candidate transforms, which may be selected according to the canonical model derived from the specification 105. The candidate transforms may be represented within the agent data store in a grid data structure as described above. The agent generator 130 may search for an "optimal" set of transforms within the data structure 200. In some embodiments, the searching may comprise the agent generator 130 iteratively modifying the candidate transforms responsive to testing.

Referring to FIG. 2, the search performed by the agent generator 130 may comprise iteratively modifying parameters of the transforms of 210A-210J and/or the respective parameters 212A-212G of the transforms and testing the resulting agent-based system against test and/or live datasets. In some embodiments, the transform modifications may be visualized as traversing the grid data structure (e.g., moving within the columns 212A-212G of one or more of the transforms (rows 210A-210J)). For example, a particular version 212D of a transform 210D may be modified according to a modification vector 214 to use a variant 212B of the transform 210D. Alternatively, or in addition, transforms may be iteratively added, removed, and/or replaced within the data structure 200 (e.g., by adding, removing, or replacing a transform in a row 210A-210J of the data structure 200 according to a "mutation" structural transform). For example, a modification 216 may replace a particular transform 210D with another transform 210B. The nature of the modification to the transforms and/or transform replacements may be visualized as a localized search with the data structure 200. Given the nature of the datastructure 200, several independent, parallel optimization searches may be performed at once within different portions of the datastructure 200. Accordingly, the optimization process of the agent generator (not shown) may be highly parallelizable.

After each modification, the performance of the resulting set of transforms may be evaluated. The evaluation may comprise applying a "fitness" function to a result produced by the set of transforms (according to user-defined performance criteria). The iterative modifications may continue until an "optimally performing" agent-based system is found. The process of selecting an "optimal" agent-based system, however, may have no closed-form solution. In fact, for the general problem of assembling an agent-based system, it may not be possible to define conditions or closed-form equations capable of identifying an optimal solution. As such, selection of an optimal set of transforms may not be possible using standard, closed form computing techniques (e.g., linear programming, etc.). Therefore, the agent generator 130 may be configured to use non-linear techniques, such as local search, genetic algorithms, generate and test, line search, Nelder-Mead simplex, gradient descent, Lagrange, and the like to select an optimal set of transforms. The optimization techniques may be adapted to avoid local maxima/minima, minimize processing time (e.g., avoid thrashing), avoid non-convergence, etc.

Figure 3:
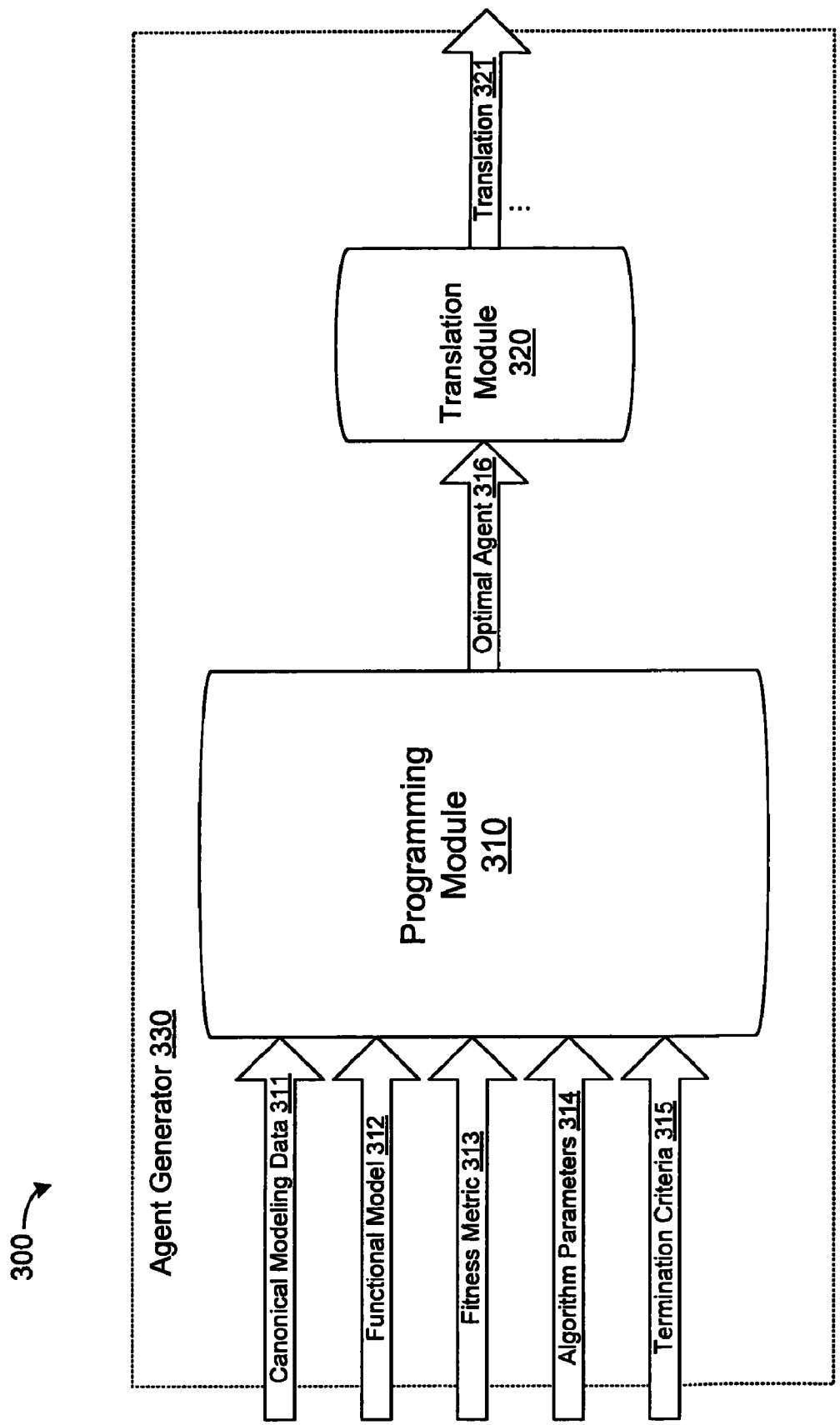
FIG. 3 is a data flow diagram of one embodiment of an agent generator.

FIG. 3 is a dataflow diagram implemented by one embodiment of an agent generator 330, such as the agent generator 130 of FIG. 1A. The agent generator 330 includes a programming module 310, which may be configured to perform an optimization function. The agent generator 330 (including the programming and/or translation modules 310 and 320) may be implemented on and/or in conjunction with a computing device. Accordingly, portions of the agent generator 330 may be implemented as computing device executable instructions embodied on a computer-readable storage medium (not shown).

The programming module 310 may comprise a non-linear optimization process, such as a genetic programming process, an evolutionary programming process, a local search, a generate and test programming process, a line search programming process, a Nelder-Mead simplex process, or the like.

The programming module 310 may receive canonical modeling data 311, which, as discussed above, may comprise an ontological mapping between an agent specification and an ontology. The canonical modeling data 311 may further comprise information relating to one or more datasets to be processed by the agent-based system (e.g., identify ontological concepts corresponding to the data). In some embodiments, the canonical model 311 data may be determined using an ontology mapping module, such as the ontology mapping module 136 of FIG. 1A.

The programming module 310 may also receive a functional model data 312, which may comprise one or more transforms available to the programming module 310, such as data preprocessing transforms, machine learning algorithm transforms, structural transforms, and the like provided by the harvester, integration, and machine learning modules 120, 122, and 124 of FIG. 1A. In some embodiments, the functional model data 312 may be represented as a data structure, such as the data structure 200 of FIG. 2.

The programming module 310 generates one or more candidate agents using the canonical modeling data 311 and the functional model 312. A candidate agent-based system may comprise a set of interconnected transforms. The performance of the candidate agent-based systems may be evaluated using a fitness metric 313. The fitness metric may be included and/or derived from the canonical model 311. For example, if the canonical model 311 defines a task to be performed by the agent-based system, the fitness metric 313 may quantify the performance or "fitness" of a candidate agent-based system at implementing the task (e.g., quantify the ability of a system to identify "Inverted Cup" stock patterns). In some embodiments, the fitness metric 313 may be evaluated against one or more sets of training data. The training data may comprise data for which a set of "correct" results are known. The fitness metric 313 may be proportional to the number of "correct" results obtained by a candidate agent-based system. In other embodiments, real world data may be used. In this case, the evaluation of candidate agent performance may be based on an error rate of the candidate agent, as determined by a third-party data source, a human operator, or the like. The fitness metric 313 may include an efficiency metric, which may quantify the computing resources required by each candidate agent (e.g., quantify the processing time and/or computing resources required to implement each candidate agent).

A set of algorithm parameters 314 may be used by the programming module 310 to modify the transforms used by one or more candidate agents. The algorithm parameters 314 may be stored in an agent data store, such as the agent store module 132 of FIG. 1A (e.g., in the two dimensional grid data structure 200). The algorithm parameters 314 may relate to any modification of a candidate transform including, but not limited to: modifying a location (e.g., URI) from which data is read; modifying preprocessing instructions (e.g., filtering rules, data cleansing, etc.); modifying a transform arrangement (e.g., transform selection, ordering, dataflow, etc.); modifying machine learning algorithms parameters (e.g., thresholds, weights, etc.); modifying a structural relationships between transforms; adding, removing, and/or replacing transforms; and the like.

In some embodiments, the algorithm parameters 314 available to the programming module 310 may be determined by the capabilities of the transforms used to implement the agent-based system (e.g., by the functional model data 312). For example, the functional model data 312 may indicate which parameters of a particular transform may be modified, provide modification thresholds, and so on.

The programming module 310 may further receive termination criteria 315. As discussed above, the identification of an optimal agent-based system may be an iterative process having no closed-form solution. As such, it may be difficult for the programming module 310 to known when an optimal solution has been reached (e.g., as opposed to a local maxima/minima or the like). The termination criteria 315 may define when the programming module 310 is to stop iteratively searching for an "optimal" agent-based system. For example, the termination criteria 315 may specify a fitness threshold of an "optimal" system (e.g., minimal error on the training set and/or real-time data, iteration count, etc.). In some embodiments, the termination criteria 315 may comprise an iteration count to limit the number of permutations investigated by the programming module 310. In other embodiments, the termination criteria 315 may comprise an improvement rate metric to terminate the search if successive iterations do not significantly improve the performance of the agents. Such a termination criteria 315 may comprise local minima and/or local maxima detection.

The programming module 310 may use the inputs 311, 312, 313, 314, and 315 to search for an optimal agent output 316. As discussed above, the programming module 310 may use any of a plurality of different processes to determine an optimal agent 316. Examples of such processes are described in additional detail below.

The output 316 of the programming module 310 may comprise an agent-based system capable of performing the tasks defined in the canonical model input 311. The optimal agent output 316 may comprise a set of transforms executable by a computing system, such as a general purpose computing system (e.g., a personal computing system or the like), a special purpose computing system (e.g., an Application Specific Integrated Circuit (ASIC) based computing system, a Field Programmable Gate Array (FPGA) based computing system, or the like), a mobile computing system, or the like.

In some embodiments, the optimal agent output 316 may flow to a translation module 320, which may be configured to translate the agent output 316 into a translation 321 of the optimal agent, which is configured to be executable by a particular type of computing device. For example, the optimal agent 316 may be translated into computing device executable code (e.g., compiled code). The translation 321 may be adapted to be executed by a computing device of a particular type (e.g., an X.86 processor, a particular type of RISC processor, a particular type of ASIC, or the like). In some embodiments, the translation 321 of the optimal agent 316 may comprise a plurality of computer executable modules capable of being executed by a plurality of computing devices (e.g., in a distributed computing environment, such a grid computing environment or the like). For example, the translation 321 may comprise a plurality of Enterprise Java Beans (EJB) executable by one or more J2EE servers or the like.

In some embodiments, the translation 321 may be embodied in a computing-device interpretable language that may be consumed (interpreted) by another computing device. For instance, the optimal agent 316 may be expressed as an XML data structure defining an agent-based system (e.g., defining the transforms comprising the system, the configuration of the transforms, the data flow and/or ordering of the transforms, and so on). The data structure in the translation 321 may be interpretable by another computing device (not shown) to implement the agent-based system defined thereby. Accordingly, the translation 321 produced by the translation module 320 may comprise an intermediate language interpretable by a plurality of different computing devices configured to interpret the data structure, to generate and/or obtain computing-device executable code corresponding to the transforms within the datastructure, and to implement the agent defined by the datastructure.

Although not shown in FIG. 3, the optimal agent output 316 and/or translation 321 may be stored in a computer-readable storage media (not shown), such as a database. In this way, the optimal agent 316 and the translation 321 thereof may be made available to one or more users and/or computing devices at a later time. Similarly, the optimal agent output 316 and/or translations 321 thereof may be transmitted to one or more users for use by the one or more users and/or remote computing devices over a data communications network, such as network 102 of FIG. 1A.

Figure 4:
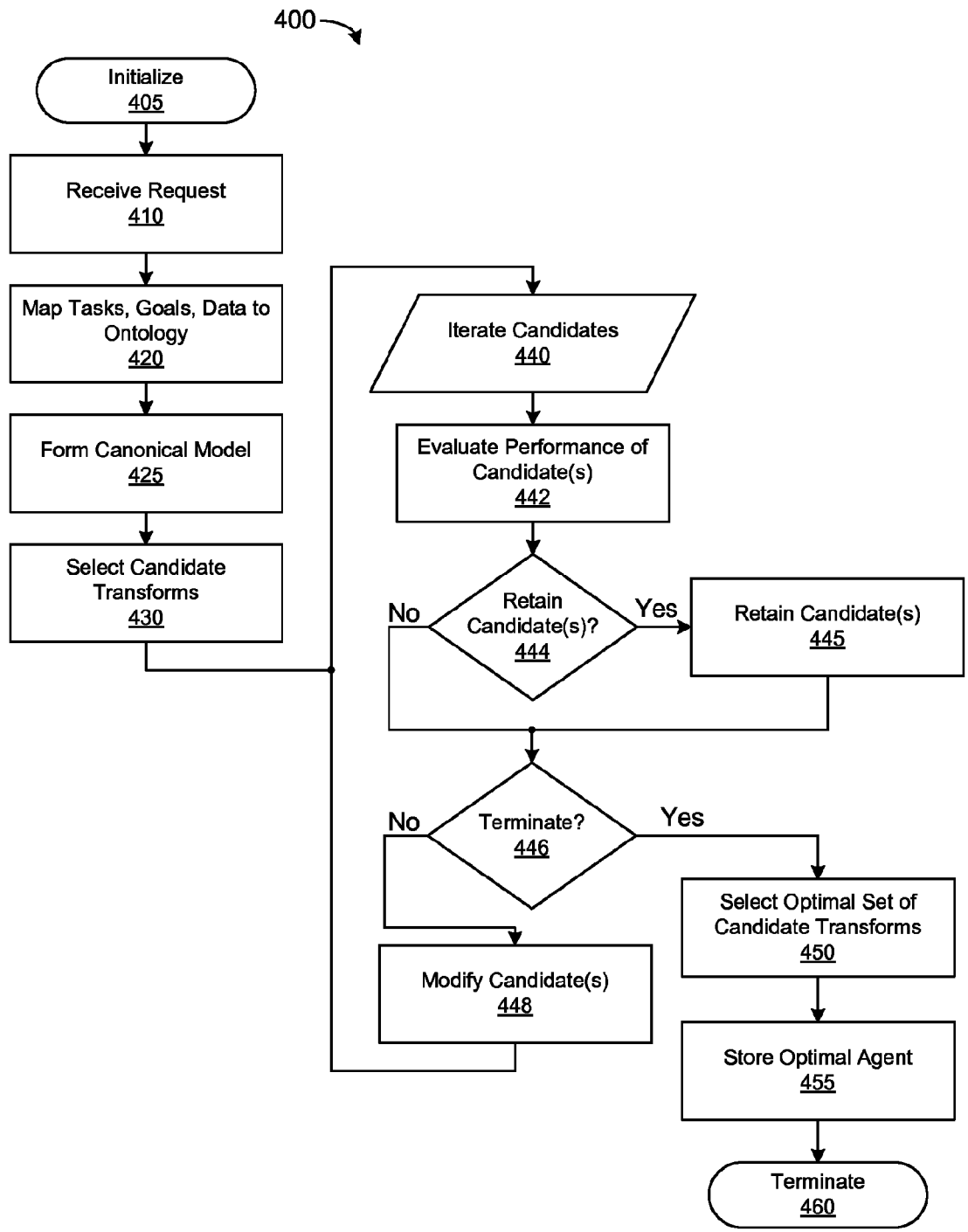
FIG. 4 is a flow diagram of one embodiment of a method for automatically generating an agent-based system.

FIG. 4 is a flow diagram of one embodiment of a method for generating an agent-based system. The method 400 may be implemented by a programming module, such as the programming module 310 of FIG. 3 and/or an agent generator, such as the agent generator 130 of FIG. 1A. The method 400 may comprise one or more computer-executable instructions. The instructions comprising the method 400 may be implemented as one or more distinct software modules. The instructions and/or software modules may be embodied on a computer-readable storage medium, such as a disc, optical storage medium, memory, or the like. In some embodiments, one or more steps of the method 400 may be tied to particular machine components, such as computer-readable storage media, communications interfaces, processing modules, or the like.

At step 405, the method 400 may be initialized, which may comprise loading instructions comprising the method 400 from a computer-readable storage media, allocating resources for the process 400, initializing allocated resources, and the like.

At step 410, the method 400 may receive a request to generate an agent system. The request of step 410 may comprise a specification, such as the specification 105 of FIG. 1A. The specification may be generated by a human user and/or may have been automatically generated by another process and/or computing device responsive to a user request (e.g., a search query or the like). The specification may identify one or more tasks to be performed by an agent-based system. Alternatively, or in addition, the specification may identify one or more data sources and/or data types to be processed by the agent-based system.

At step 420, the tasks and/or data identified in the request may be mapped to one or more concepts within an ontology as described above. The mapping may comprise comparing one or more terms within the request to one or more concepts within the ontology. In some embodiments, the mapping may further comprise disambiguating between candidate concepts using a spreading activation algorithm or the like.

The concepts identified at step 420 may be used to form a canonical model of the request at step 425. The canonical model may include an ontological representation of the agent specification received at step 410. In some embodiments, the request received at step 410 may include a canonical model. For example, the request may be provided in an ontological format, such as CLF, RIF, OWL, or the like. If so, the mapping and modeling steps 420 and 425 may be omitted. Alternatively, or in addition, if the canonical model refers to a different ontology, a translation step may be included, which may translate the canonical model in the request into an ontology used by the method 400.

At step 430, a set of candidate transforms comprising an agent-based system may be selected. The candidate transforms comprising the agent-based system(s) may be selected using the canonical model determined at step 425. (e.g., the transforms may be selected according to the tasks defined in the canonical model 425, the data types specified in the model 425, and so on). The selection of step 430 may be based upon a priori knowledge regarding which transforms are likely to be effective at performing the tasks and/or processing the data types specified in the canonical model. For example, if the canonical model calls for a group classification, the agent-based system may include a naïve Bayes machine learning transform.

The candidate transforms selected at step 430 may be represented as a set of interconnected transforms (e.g., in a grid data structure, such as the data structure 200 of FIG. 2). Modifications to an agent-based system represented in graph form may be made by: modifying a particular transform in the graph (e.g., modifying a parameter of the transform or the like); modifying a relationship between transforms (e.g., changing the order of transforms within the graph or the like); adding and/or removing transforms from the graph; or any other graph- or grid-based operation.

As discussed above, the selection of the candidate transforms at step 430 may leverage stored expert knowledge expressed as one or more rules. For example, expert knowledge may indicate that a particular machine learning algorithm (e.g., transform) is effective at processing a particular data type and/or effective at performing a particular type of task. The method 400 may compare the canonical model to this expert knowledge to identify one or more transforms likely to yield an effective agent-based system.

At step 440, the set of candidate transforms defined at step 430 may be used to identify an optimal agent. As such, at step 440, the method 400 may iterate over one or more variations of the candidate transforms. The iteration of step 440 may be part of a non-linear, meta-machine learning algorithm, such as a genetic algorithm, an evolutionary programming algorithm, or the like. Accordingly, one iteration of the step 440 through 448 may comprise a single "generation" of the candidate transforms. As will be discussed below, each iteration of the steps 440-448 may cause one or more of the candidate transforms to be modified (e.g., mutated). The modification may result in a better performing agent-based system.

The various iterations and/or modifications of step 440 through 448 may be independent of one another. As such, the resulting iterations over steps 440-448 may be highly parallelizable. Accordingly, in some embodiments, multiple iterations of the steps of 440-448 may be performed concurrently using parallel threads (on a single and/or multi-core processor), on distributed processors within a particular computing device, on a plurality of distributed computing systems, or the like.

At step 442, the performance of each set of candidate transforms may be evaluated. As discussed above, the performance evaluation may comprise providing an agent-based system (comprising a set of candidate transforms) with a set of input data and evaluating the results provided thereby. The performance of the candidate system may relate to the ability of the system to perform the tasks defined in the canonical model (e.g., based upon an error rate of the candidate transforms). The data may comprise a set of test data, for which a known solution exists. In other embodiments, the performance evaluation of step 442 may comprise applying real-world, "in-process" data to an agent and determining an error rate thereof (e.g., using a third-party service, another agent-based system, a human operator, or the like).

At step 444, the method 400 may determine whether a particular set of candidate transforms should be retained. In embodiments employing algorithms having fixed population of candidates (e.g., genetic and/or evolutionary processes), one or more high performing members of the population may be retained across multiple iterations 440. This may allow the highly performing candidates to mutate multiple times while preventing the method 400 from becoming "stuck" on a local minima. Additional candidates may be retained on a random basis and/or based on the performance of the candidate as compared to other candidates in the generation. If, at step 444, the candidate should be retained, the flow may continue to step 445, where the process may retain the candidate for further processing (e.g., by storing the candidate in a datastructure, marking a field in a datastructure associated with the candidate, or the like); otherwise, the candidate may be discarded.

At step 446, termination criteria may be evaluated to determine whether the iteration of step 440 should continue. As discussed above, the iterative steps 440-448 may comprise a termination criteria indicating when the process 400 should stop looking for increasingly optimal results. The termination criteria may be associated with a maximum number of iterations, a target performance threshold, a rate of change metric, a derivative metric, or the like. If the termination criteria are satisfied, the flow may continue to step 450; otherwise, the flow may continue to step 448.

At step 448, the current set of candidate transforms may be modified (e.g., mutated) according to the algorithm implemented by the process 400. The mutation may comprise performing a grid-based modification as described above (e.g., implementing a variation defined within the data structure 200 of FIG. 2). In some embodiments, the original (non-mutated) set of candidate transforms (or a record thereof) may be retained in the candidate pool. This may allow original, non-mutated set of candidate transforms to be reconstructed in the event that the method 400 determines that the current set of transforms is "optimal."

In some embodiments, the modification of step 448 may comprise traversing the grid data structure 200 of FIG. 2. As discussed above, in some embodiments, a set of candidate transforms may be embodied as a grid of transforms with rows representing transforms, and columns representing transform variations. A modification at step 448 may comprise selecting a variant of a particular transform by selecting an alternative column within the data structure 200, selecting a different transform type by selecting an alternative row within the data structure 200, or the like. Examples of such modifications are described above in conjunction with FIG. 2.

In other embodiments, an agent-based system may be represented in another data structure, such as an interconnected graph, in which transforms are represented as vertices and data flow by graph edges. In these embodiments, a modification at step 448 may comprise, but is not limited to: adding a new transformation to the graph (e.g., as a new graph vertex); removing a transformation from the graph (e.g., removing a graph vertex); adding and/or substituting a vertex in the graph; modifying an order of vertices within the graph; modifying vertex connections; and the like. Other transforms may comprise modifying a parameter of a transform by modifying a graph vertex.

Step 448 may impose preconditions defining which transformations may be made to the candidate transforms. For instance, certain structural modifications may result in an inoperable agent (e.g., removing all "harvest data" steps, placing incompatible transforms in series, and so on). Accordingly, the method 400 may include one or more preconditions, which may determine which modifications may be made to a set of candidate transforms and which may not. In addition, step 448 may comprise a validation step, in which the modified candidate transforms are validated as forming an operable agent-based system.

Following the modification of step 448, the flow may continue to step 440, where the iteration may continue.

At step 450, the iteration of steps 440-448 may terminate. Responsive to the termination, the method 400 may select the "optimal" set of candidate transforms from the remaining candidates (or a previous recorded candidate transforms). The "optimal" candidate may be the highest performing candidate (e.g., the candidate having the highest performance according to one or more fitness metrics). In some embodiments, other factors may be used in determining which candidate is "optimal." For example, a size and/or computational complexity of the agent-based systems may be evaluated. A simpler and/or faster agent-based system may be considered to be more optimal relative to a similarly performing larger and/or more computationally expensive system.

At step 455, the selected agent-based system may be stored for use by one or more users and/or external processes. In addition, as discussed above, the selected agent may be translated into a format that is consumable by the one or more users and/or external processes. At step 460, the flow may terminate.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a computer-readable storage medium having stored thereon instructions that may be used to program a computer (or other electronic device) to perform processes described herein. The computer-readable storage medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, module, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the disclosure.

We claim:

1. An apparatus for generating an agent-based system, comprising:
   a computing device comprising a processor and a non-transitory computer-readable storage medium;
   an agent generator embodied on the computer-readable storage medium and operable on the processor, the agent generator configured to receive an agent specification; and
   an ontology mapping module embodied on the computer-readable storage medium and operable on the processor, the ontology mapping module configured to derive a canonical model from the agent specification, wherein the canonical model comprises a mapping between the agent specification and an ontology, the ontology comprising a plurality of interconnected concepts, each concept being connected to one or more related concepts in a graph;
   wherein the agent generator is configured to generate an agent-based system comprising a plurality of candidate transforms using the canonical model, to iteratively modify the candidate transforms comprising the agent-based system until a termination criteria is satisfied by one or more of adding one or more transforms to the plurality of candidate transforms and removing one or more transforms from the plurality of candidate transforms, and to select a set of candidate transforms from the plurality of candidate transforms responsive to satisfying the termination criteria.

2. The apparatus of claim 1, wherein the plurality of candidate transforms comprises a data acquisition transform configured to acquire data from a network accessible data source.

3. The apparatus of claim 2, wherein the plurality of candidate transforms comprises an integration transform configured to preprocess the data accessed from the network accessible data source.

4. The apparatus of claim 1, wherein the plurality of candidate transforms comprises a machine learning transform configured to process a dataset to produce a result.

5. The apparatus of claim 4, wherein the agent generator is configured to determine a fitness metric of the plurality of candidate transforms using the result.

6. The apparatus of claim 5, wherein the dataset comprises a test dataset having a known result, and wherein the fitness metric of the plurality of candidate transforms is based on a comparison of the known result to the result produced by plurality of candidate transforms.

7. The apparatus of claim 5, wherein the dataset comprises data accessed from a network accessible data source, and wherein the fitness metric of the plurality of candidate transforms is based on a comparison of the result produced by the plurality of candidate transforms and a result provided by a third-party.

8. The apparatus of claim 7, wherein the third-party is a human operator.

9. The apparatus of claim 5, wherein the termination criteria comprises a fitness metric threshold.

10. The apparatus of claim 5 wherein the termination criteria comprises a fitness metric change threshold.

11. The apparatus of claim 1, wherein the termination criteria comprises an iteration limit.

12. The apparatus of claim 1, wherein the candidate transforms are represented within a grid data structure, and wherein modifying the candidate transforms comprises traversing the grid data structure.

13. The apparatus of claim 12, wherein each of the candidate transforms is represented as a row in the grid data structure, wherein each row comprises a plurality of columns, each column representing a variation of a respective transform, and wherein modifying the candidate transforms comprises traversing a grid column.

14. The apparatus of claim 13, wherein modifying the candidate transforms comprises traversing a row, and wherein traversing a row replaces a first one of the plurality of candidate transforms with a second candidate transform.

15. A non-transitory computer-readable storage medium comprising instructions configured to cause a computing device comprising a processor and memory to perform a method, the method comprising:
   deriving a canonical model from an agent specification, the canonical model comprising an ontological mapping between a task specified in the agent specification and one or more concepts within an ontology, wherein each of the one or more concepts comprises a vertex connected to one or more other concepts in an ontological graph;
   selecting a plurality of candidate transforms based on the one or more ontological concepts of the canonical model;
   iteratively modifying the plurality of candidate transforms until a termination criteria is satisfied by one or more of adding one or more transforms to the plurality of candidate transforms and removing one or more transforms from the plurality of candidate transforms; and
   constructing an agent-based system from a selected plurality of the modified candidate transforms responsive to satisfying the termination criteria.

16. The computer-readable storage medium of claim 15, wherein iteratively modifying the plurality of candidate transforms comprises:
   processing a dataset using the plurality of candidate transforms; and
   calculating a fitness metric of the plurality of candidate transforms using a result of the task performed by the plurality of candidate transforms responsive to a dataset, wherein the iterative modification of the plurality of candidate transforms is based on the fitness metric.

17. The computer-readable storage medium of claim 16, wherein the termination criteria comprises a fitness metric threshold.

18. The computer-readable storage medium of claim 16, wherein the termination criteria comprises a fitness metric change threshold.

19. The computer-readable storage medium of claim 16, wherein the plurality of candidate transforms are represented within a grid data structure in which each of the plurality of candidate transforms is represented by a respective row of the grid data structure and variations of each of the plurality of candidate transforms are represented by respective columns within the grid data structure, and wherein iteratively modifying the plurality of candidate transforms comprises a modification to the grid data structure.

20. The computer-readable storage medium of claim 19, wherein the modification to the grid data structure comprises modifying a parameter of one of the plurality of candidate transforms by traversing a column of the grid data structure.

21. The computer-readable storage medium of claim 19, wherein the modification to the grid data structure comprises replacing a first one of the plurality of candidate transforms within a second candidate transform by replacing a first row within the grid data structure with a second row.

22. The computer-readable storage medium of claim 16, wherein one of the plurality of candidate transforms is a structural transform defining data flow between a first transform in the plurality of candidate transforms and a second transform in the plurality of candidate transforms, and wherein iteratively modifying the candidate transforms comprises modifying the data flow between the first and the second transforms.

23. The computer-readable storage medium of claim 16, constructing an agent-based system responsive to satisfying the termination criteria comprises selecting a set of transforms from the plurality of candidate transforms based upon a fitness metric assigned to the plurality of candidate transforms.

24. A method performed by a computing device comprising a processor and memory for constructing an agent-based system, the method comprising:
deriving a canonical model from an agent specification by mapping a task defined in the agent specification to one or more ontological concepts stored in an ontology embodied on a computer-readable storage medium, wherein the ontology is embodied as a graph comprising a plurality of interconnected concepts, each concept being connected to one or more related concepts by one or more graph edges;
selecting a set of candidate transforms using the canonical model, the set of candidate transforms configured to perform the task defined in the agent specification;
iteratively modifying the set of candidate transforms to produce a plurality of alternative sets of candidate transforms until a termination criteria is satisfied, wherein each of the alternative sets is configured to perform the task defined in the agent specification, and wherein each of the alternative sets is assigned a respective fitness metric, wherein modifying the set comprises one or more of adding one or more transforms to the set and removing one or more transforms from the set; and
generating an agent-based system using a selected one of the alternative sets of candidate transforms responsive to satisfying the termination criteria.

25. The method of claim 24, further comprising translating the agent-based system into one or more computer-readable instructions configured to cause a computing device to implement the agent-based system.

26. The method of claim 24, wherein the selected set of candidate transforms comprises a data acquisition transform configured to acquire data from a network accessible data source and a machine learning transform configured to perform the task defined in the agent specification.

27. The method of claim 24, wherein the selected set of candidate transforms is represented as a graph of interconnected candidate transforms, wherein the graph interconnections define data flow between the set of candidate transforms, and wherein iteratively modifying the set of candidate transforms comprises iteratively structurally modifying the graph interconnections.

28. The method of claim 24, wherein the selected set of candidate transforms is represented within a grid data structure in which each of the candidate transforms is represented by a grid row and variations of each of the candidate transforms are represented by respective grid columns, and wherein iteratively modifying the set of candidate transforms comprises iteratively traversing the grid data structure.

* * * * *